I

United States Patent
Nainar et al.

(10) Patent No.: US 10,103,976 B2
(45) Date of Patent: Oct. 16, 2018

(54) SERVICE BITMASK-BASED SERVICE APPLICATION IN SERVICE FUNCTION CHAINING

(71) Applicant: Cisco Technology, Inc., San Jose, CA (US)

(72) Inventors: Nagendra Kumar Nainar, Morrisville, NC (US); Carlos M. Pignataro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 279 days.

(21) Appl. No.: 14/795,174

(22) Filed: Jul. 9, 2015

(65) Prior Publication Data

US 2017/0012865 A1 Jan. 12, 2017

(51) Int. Cl.
G06F 15/173 (2006.01)
H04L 12/721 (2013.01)
H04L 12/851 (2013.01)
H04L 12/715 (2013.01)
H04L 29/08 (2006.01)

(52) U.S. Cl.
CPC .............. *H04L 45/38* (2013.01); *H04L 45/64* (2013.01); *H04L 47/2483* (2013.01); *H04L 67/322* (2013.01)

(58) Field of Classification Search
CPC ......... H04L 45/38; H04L 45/74; H04L 47/24; H04L 41/0853; H04L 69/22
See application file for complete search history.

(56) References Cited

U.S. PATENT DOCUMENTS

| 7,913,529 B2 | 3/2011 | Bagepalli et al. |
| 2013/0272305 A1* | 10/2013 | Lefebvre ................ H04L 47/24 370/392 |
| 2014/0280836 A1 | 9/2014 | Kumar et al. |
| 2014/0334295 A1 | 11/2014 | Guichard et al. |
| 2014/0334488 A1 | 11/2014 | Guichard et al. |
| 2014/0351452 A1 | 11/2014 | Bosch et al. |
| 2014/0362682 A1 | 12/2014 | Guichard et al. |
| 2017/0104671 A1* | 4/2017 | Zhang ................ H04L 12/4633 |

OTHER PUBLICATIONS

P. Quinn, et al., "Network Service Header; draft-quinn-nsh-03.txt"; Network Working Group; Jul. 3, 2014; 27 pages. Available online at https://tools.ietf.org/html/draft-quinn-sfc-nsh-03.*
R. Krishnan et al., "SFC Long-lived Flow Use Cases", SFC Working Group, Internet Draft, Feb. 6, 2015, 10 pages.
S. Kumar et al., "Service Function Path Optimization", Service Function Chaining, Internet Draft, Cisco Sysytems, Inc., Oct. 2014, 15 pages.

* cited by examiner

*Primary Examiner* — Arvin Eskandarnia
*Assistant Examiner* — Austin Moreau
(74) *Attorney, Agent, or Firm* — Edell, Shapiro & Finnan, LLC

(57) ABSTRACT

A computer-implemented method performed at a classifier network element includes receiving a flow of packets subject to a Service Function Path. The Service Function Path defines which service functions a flow will receive and the order in which the service functions will be provided. A service bitmask is generated that indicates that one or more service function will be skipped. The classifier network element encapsulates the flow as a payload with a Network Service Header comprising a Service Function Path identifier, a service index, and the service bitmask.

20 Claims, 11 Drawing Sheets

SERVICE BITMASK-BASED SERVICE APPLICATION IN SERVICE FUNCTION CHAINING

TECHNICAL FIELD

The present disclosure relates to applying service functions in computer networks.

BACKGROUND

Service Function Chaining enables virtualized networking functions to be implemented as part of a cloud network. A Service Function Chain defines an ordered list of a plurality of service functions (e.g., firewall, compression, intrusion detection/prevention, load balancing, etc.) that may be applied to flows in the network. A flow enters the network through a classifier node that generates a Service Function Path for that flow according to the Service Function Chain policy. The Service Function Path indicates the service functions to which the flow will be subjected, and the order the service functions will be applied.

DESCRIPTION OF EXAMPLE EMBODIMENTS

Overview

Techniques are presented herein for efficient application of service function chaining in computer networks. A computer-implemented method is performed at a classifier network element, the method including receiving a flow of packets subject to a service function path. The service function path comprises a plurality of service functions in a specific order. A service bitmask is generated that indicates that one or more service functions will be skipped. The classifier network element encapsulates the flow as a payload with a network service header comprising a service function path identifier, a service index, and the service bitmask.

Example Embodiments

A Service Function Chain system allows data flows to be subjected to a plurality of service functions offered as network services, e.g., as part of a cloud network. In some instances, a particular service function may not be applicable to a particular flow, especially a long lived flow. The techniques described herein modify the network service header to allow the network controller to modify a particular Service Function Path (SFP) as an instance of a Service Function Chain that may skip one or more of the service functions that may not be required for a particular flow. By modifying the individual SFP for an individual flow, the network controller does not create a new Service Function Chain and propagate the new Service Function Chain to each Service Function Forwarder, i.e., each network device associated with a service function.

The network controller modifies the SFP with the addition of a bitmask that is inserted, e.g., into the Network Service Header, at a classifier or ingress network node. Each position in the bitmask is associated with a particular service function, wherein if the bit is set, then the associated service function is applied in the SFP. If a bit is unset, the service function associated the unset bit will be skipped in the SFP. The change to the SFP only needs to be communicated to the classifier/ingress node, and a new Service Function Chain does not need to be communicated to all of the network elements in the network. In one example, a symmetric Service Function Chain may result in the controller using the same bitmask to apply the same flow policy to the reverse traffic.

Figure 1:
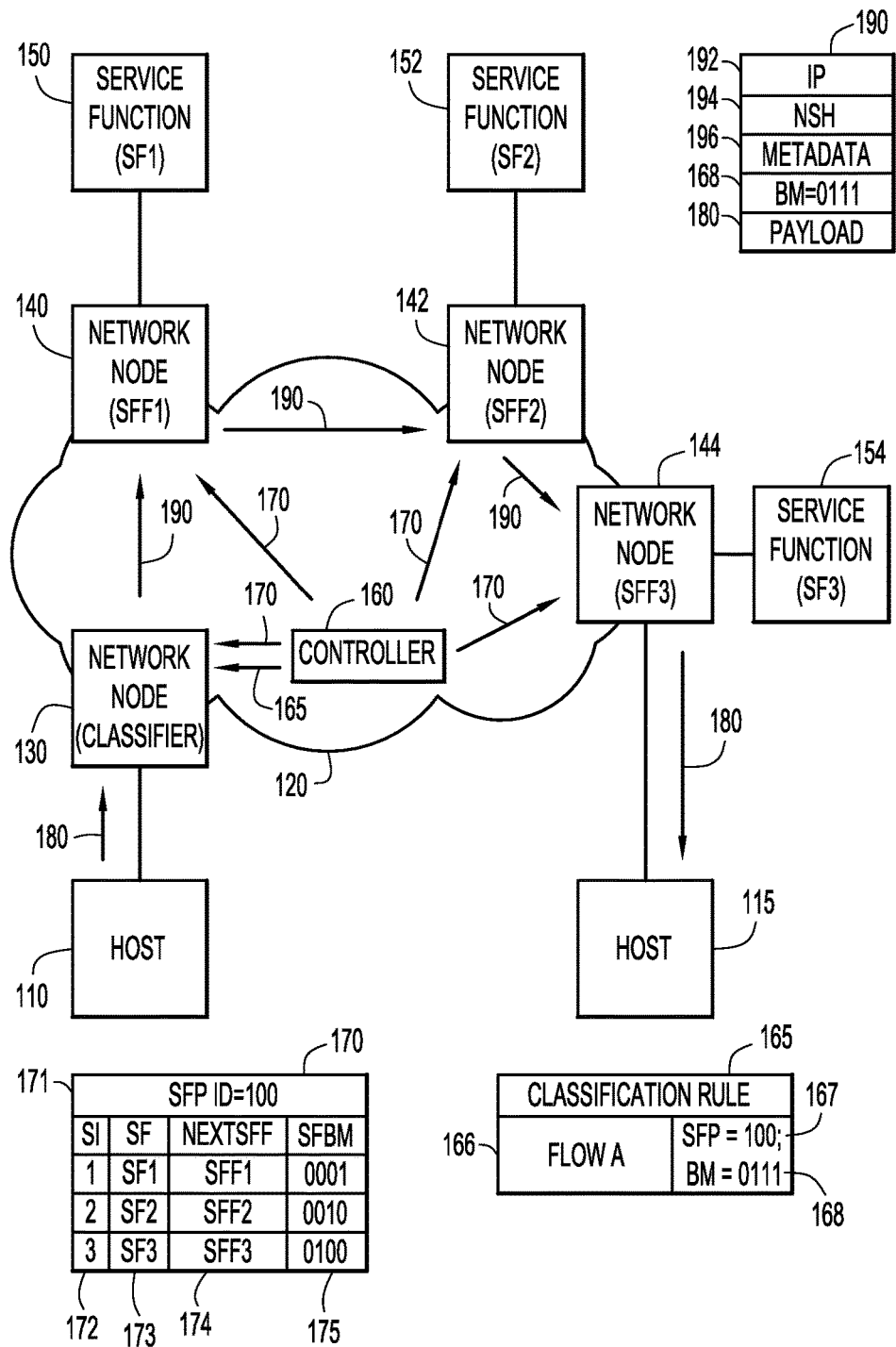
FIG. 1 is a system block diagram showing a network environment carrying a flow through a Service Function Path according to an example embodiment.

Referring now to FIG. 1, a simplified block diagram of a Service Function Chaining system 100 is shown. System 100 includes a host 110 sending a flow of data to host 115 through network 120. The data flow enters the network 120 through a network node 130 that acts as a classifier. The classifier node 130 encapsulates the flow and forwards the encapsulated flow through network nodes 140, 142, and 144 to apply service functions 150, 152, and 154, respectively. After the final service function 154 is applied at the service node 144, the encapsulation is removed from the flow and the payload is forwarded to the destination host 115.

The network 120 includes a controller 160 that coordinates the Service Function Chain system throughout the network 120. The controller 160 sends a classification rule 165 to the classifier node 130 for each flow that will be subject to a SFP. The classification rule 160 includes a flow identifier 166, a SFP identifier 167, and a service bitmask 168.

The controller 160 also sends a SFP table 170 that defines the SFP to each of the network nodes in the network 120. The SFP table 170 includes a SFP identifier 171, and a plurality of listings corresponding to each service function that will be used in the identified SFP. Each listing includes a service index 172, a service function identifier 173, a service function forwarder 174, and a service function bitmask 175. The service index 172 determines the order in which each service function will be applied to the flow.

In operation, the source host 110 sends a data packet 180 (e.g., as part of a data flow) to the classifier node 130. The classifier node 130 determines that the data packet 180 is part of a flow identified in the classification rule 165, and encapsulates the data packet 180 as encapsulated packet 190. Encapsulated packet 190 comprises an Internet Protocol (IP) header 192, a Network Service Header 194, metadata 196, service bitmask 168, and the encapsulated payload 180. The encapsulated packet 190 is sent from the classifier node 130 to each of the service nodes 140, 142, and 144, as indicated in the SFP table 170. After the final service function 154 is performed, the service node 144 may remove the encapsulation from the payload 180 and sends the packet to the destination host 115. The service node 144 is shown sending the payload 180 directly to the destination host 115, but the payload may traverse one or more additional network elements either before or after the encapsulation is removed. The additional network elements may be part of the network 120 or outside of the network 120.

In one example, network elements 130, 140, 142, and 144 may be, for example, a switch or router in a variety of types of networks (e.g., any combination of Internet, intranet, local area network (LAN), wide area network (WAN), wired network, wireless network, etc.) that connects computing devices. Hosts 110 and 115 may be computing devices, e.g., desktop computer, laptop computer, server, virtual machine on a hypervisor, tablet computer, tablet, smart phone, etc., that communicate through the network 120. Service functions 150, 152, and 154 may be run on one or more host servers connected to the network nodes 140, 142, and 144, respectively.

FIG. 1 shows only four network elements, three service functions, and two hosts. However, the Service Function Chain system 100 may comprise any number of network elements and service functions providing services to any number of hosts using the techniques described herein. In one example, the service bitmask and the service function bitmask may comprise 32 bits, with each bit position representing a particular service function. The association between the bit position and the service function may be unique across the entire Service Function Chain domain, e.g., if the number of service functions in the Service Function Chain domain is less than the number of bits reserved for the bitmasks. Alternatively, the bit position may be associated with a particular service function only for a specific SFP, with each SFP defining its own associations between bit position and service function.

Figure 2:
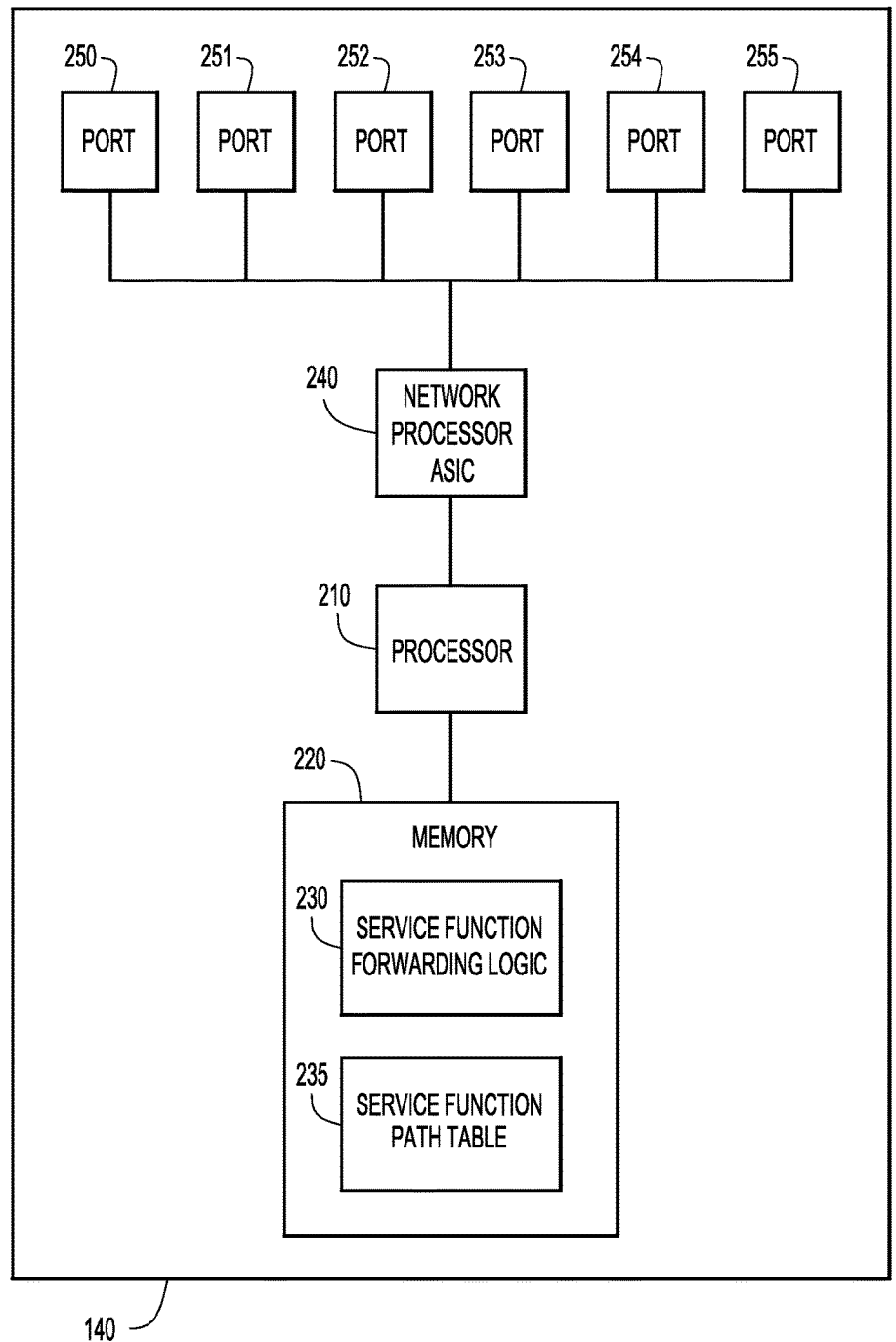
FIG. 2 is a simplified block diagram of a network device according to an example embodiment.

Referring now to FIG. 2, a simplified block diagram of a network device 140 configured to perform the techniques presented herein is shown. Network device 140 is used as an example, and network devices 142, 144, and 130 may have similar configurations. Network device 140 includes, among other possible components, a processor 210 to process instructions relevant to processing communication packets in a Service Function Chain, and memory 220 to store a variety of data and software instructions (e.g., Service Function Forwarding logic 230, a Service Function Path table 235, communication packets, etc.). The network device 140 also includes a network processor application specific integrated circuit (ASIC) 240 to process communication packets that flow through the network element 140. Network processor ASIC 240 processes communication packets be sent to and received from ports 250, 251, 252, 253, 254, and 255. While only six ports are shown in this example, any number of ports may be included in network element 140.

Memory 220 may include read only memory (ROM), random access memory (RAM), magnetic disk storage media devices, optical storage media devices, flash memory devices, electrical, optical, or other physical/tangible (e.g., non-transitory) memory storage devices. The processor 210 is, for example, a microprocessor or microcontroller that executes instructions for implementing the processes described herein. Thus, in general, the memory 220 may comprise one or more tangible (non-transitory) computer readable storage media (e.g., a memory device) encoded with software comprising computer executable instructions and when the software (e.g., the service function forwarding logic 230) is executed (by the processor 210) it is operable to perform the operations described herein.

Figure 3A:
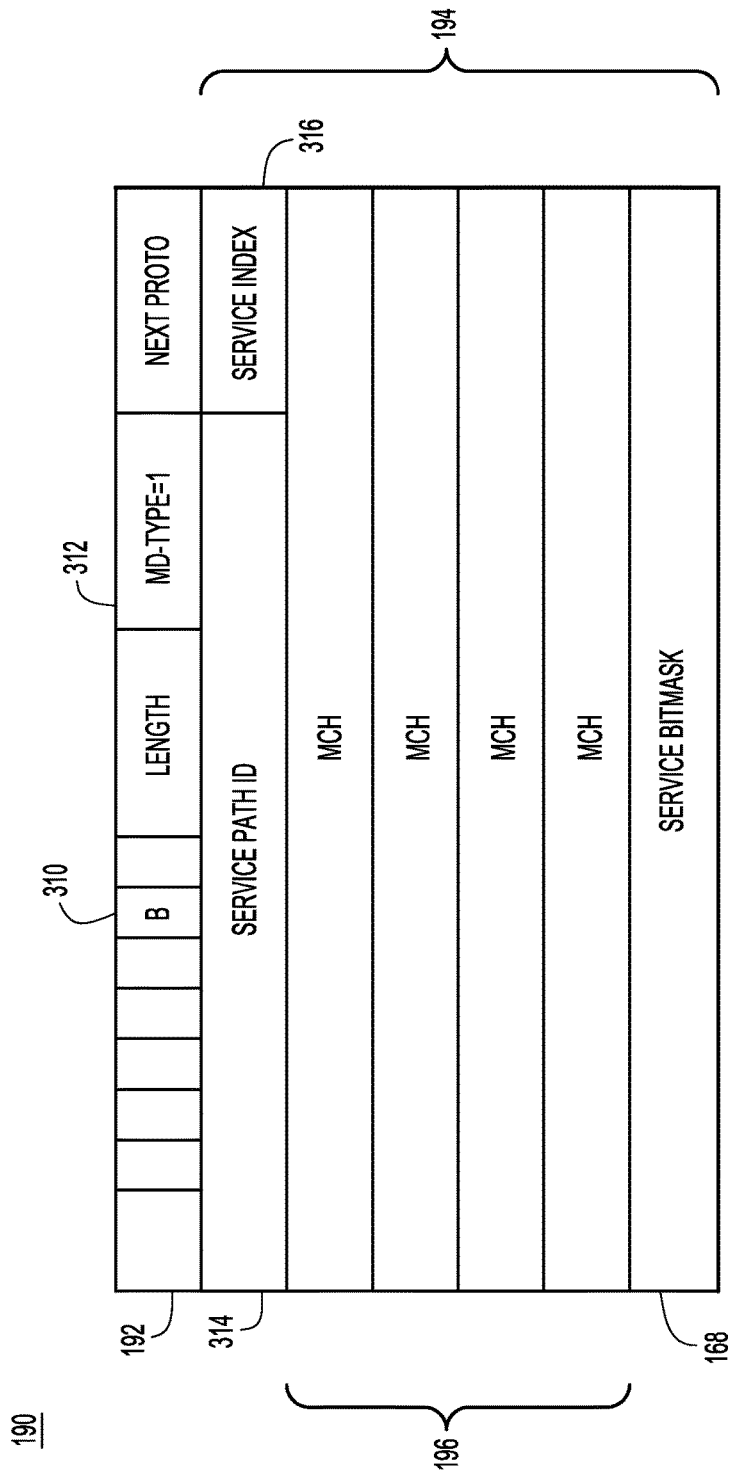
FIG. 3A is a diagram showing a Network Service Header with a service bitmask according to an example embodiment.

Referring now to FIG. 3A, a diagram shows an example of one type of encapsulation headers in an encapsulated packet 190. The IP header 192 includes a bit 310 indicating that the packet 190 includes a service bitmask. The IP header also includes a metadata field 312 indicating that the Network Service Header includes metadata of type 1. The Network Service Header 194 includes a service path identifier 314 that identifies the SFP for the packet 190, and a service index 316 that identifies the position of the packet along the SFP. As the packet 190 passes through each service function, the service index field 316 is incremented to indicate that the packet is ready to be sent to the next service function. In a Network Service Header 194 with type 1 metadata, the metadata headers 196 comprise four Metadata Content Headers of fixed length. After the metadata headers 196, the service bitmask 168 is appended to the Network Service Header. In one example, the length of the service bitmask 168 matches the length of each of the four fixed length metadata headers 196, e.g., 32 bits.

Figure 3B:
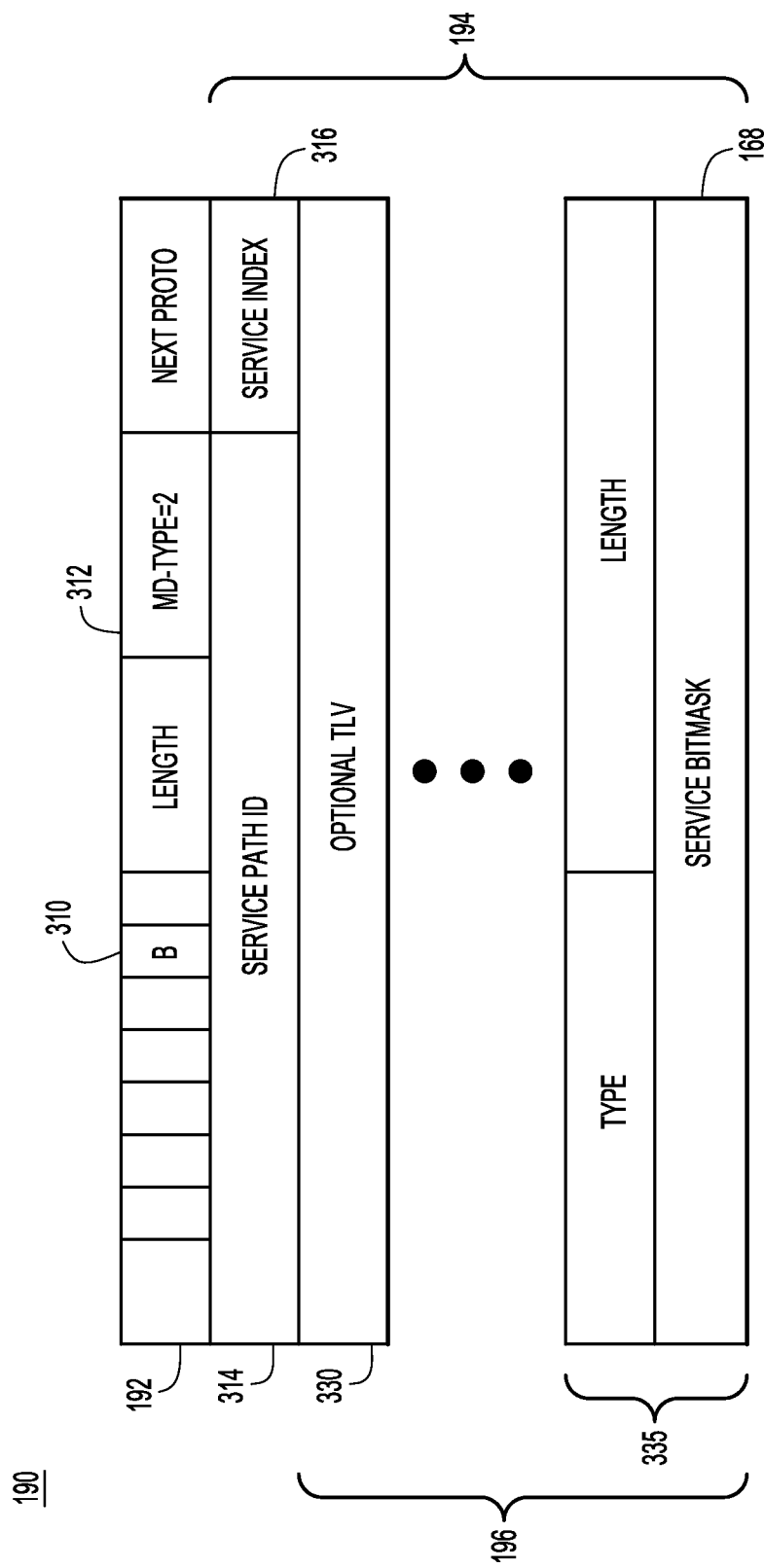
FIG. 3B is a diagram showing a Network Service Header with a service bitmask according to another example embodiment.

Referring now to FIG. 3B, a diagram shows an example of another type of encapsulation headers in an encapsulated packet 190. The IP header 192 includes the bit 310 indicating that the packet 190 includes a service bitmask. In FIG. 3B, the metadata field 312 indicates that the Network Service Header includes metadata of type 2. The Network Service Header 194 includes the service path identifier 314 and the service index 316. In a Network Service Header with type 2 metadata, the metadata headers 196 comprise one or more entries of variable length, such as Type, Length, Value (TLV) entry 330. Each TLV entry 330 includes a field indicating the type of metadata in the TLV entry, a field indicating the length of the metadata, and a field with the value of the metadata. The service bitmask 168 is included as TLV entry 335. A variable length service bitmask enables a variable number of service functions to be included in the array of possible Service Function Paths.

Figure 4:
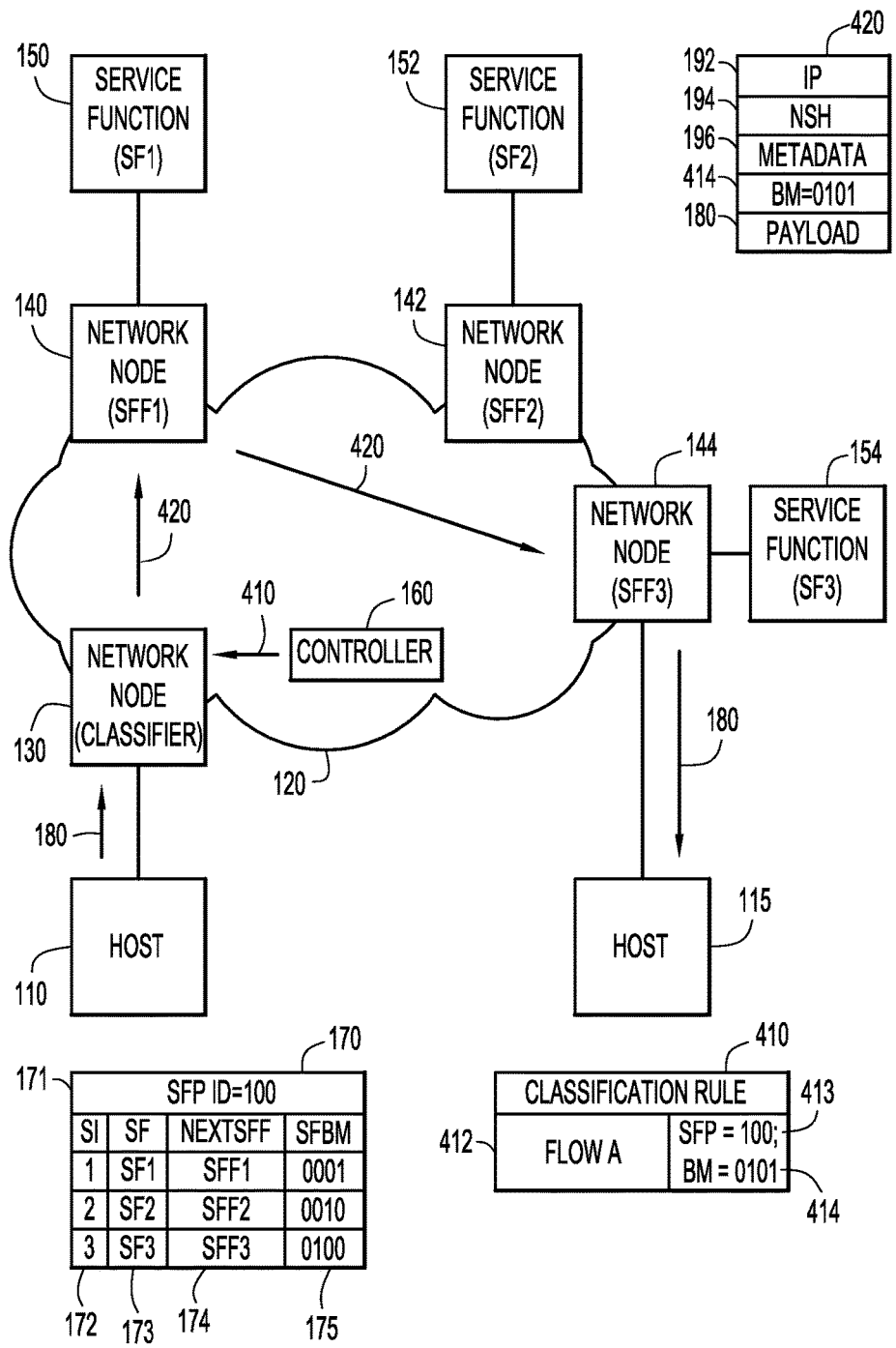
FIG. 4 is a system block diagram showing a Service Function Path that skips a service function for a flow according to an example embodiment.

Referring now to FIG. 4, a simplified block diagram shows a flow that skips one of the service functions in a SFP through the network 120 according to one example. To skip one of the service functions in a SFP for a particular flow, the controller 160 generates a new classification rule 410 for the flow. The new classification rule includes a flow identifier 412, the SFP identifier 413, and a new service bitmask 414. In the example depicted in FIG. 4, the new service bitmask 414 indicates that the second of three service functions will be skipped for this particular flow.

The new classification rule 410 is sent to at least the classifier node 130, which is the ingress node for the identified flow. When the classifier node 130 receives a data packet 180 in the flow identified by the flow identifier 412, the classifier node 130 encapsulates the data packet 180 and generates an encapsulated packet 420. The encapsulated packet 420 differs from the original encapsulated packet 190 (described above with respect to FIG. 1) in that the service bitmask 168 is replaced with the service bitmask 414. The classifier node 130 forwards the encapsulated packet 420 to the first network node 140 associated with the first service function 150. After the first service function 150 is applied, the network node 140 forwards the encapsulated packet 420 directly to the service node 144 associated with the third service function 154, skipping the second service node 142 and the second service function 152 entirely.

Figure 5:
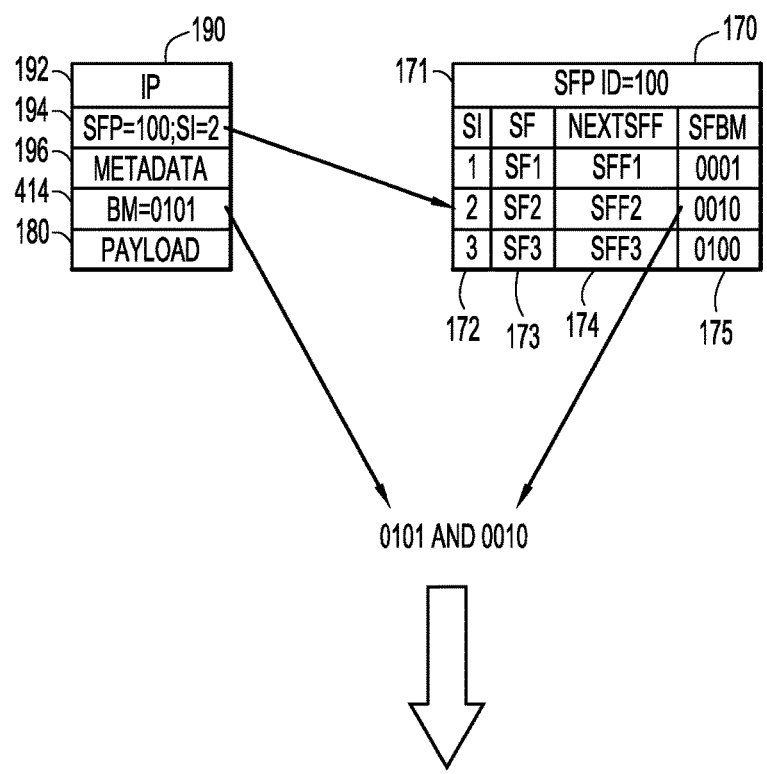
FIG. 5 is a diagram showing the comparison between the service bitmask and the service function bitmask to determine whether to skip the next service function according to an example embodiment.

Referring now to FIG. 5, a diagram shows how the network node 140 determines the next destination of a flow in a SFP. When the network node 140 receives the encapsulated packet 190, the service index in the Network Service Header 194 is set at an initial value (e.g., 1), since the network node 140 is associated with the first service function in the SFP. The service index is incremented (e.g., from 1 to 2) after the packet is sent to the first service function 150 to prepare for sending the encapsulated packet 190 for the next service function. The network node 140 looks up the service function bitmask 175 associated with the next service index (e.g., 2), and compares it to the service bitmask 414 from the encapsulation header. In one example, the comparison is a bitwise AND operation. If the result of the AND operation is zero, i.e., the next service function is to be skipped, then the network node 140 increments the service index (e.g., from 2 to 3) and repeats the lookup with the next service index. If the result of the AND operation is non-zero, i.e., the next service function is not to be skipped, then the network node 140 sends the encapsulated packet 190 to the network node 174 associated with the current service index.

In one example, each network node may compare the service bitmask with the service function bitmask to determine the next network node to be the destination of the encapsulated packet. After the last service function in the SFP is performed, then the network node associated with that service function removes the encapsulation and sends the packet to the final destination.

Figure 6:
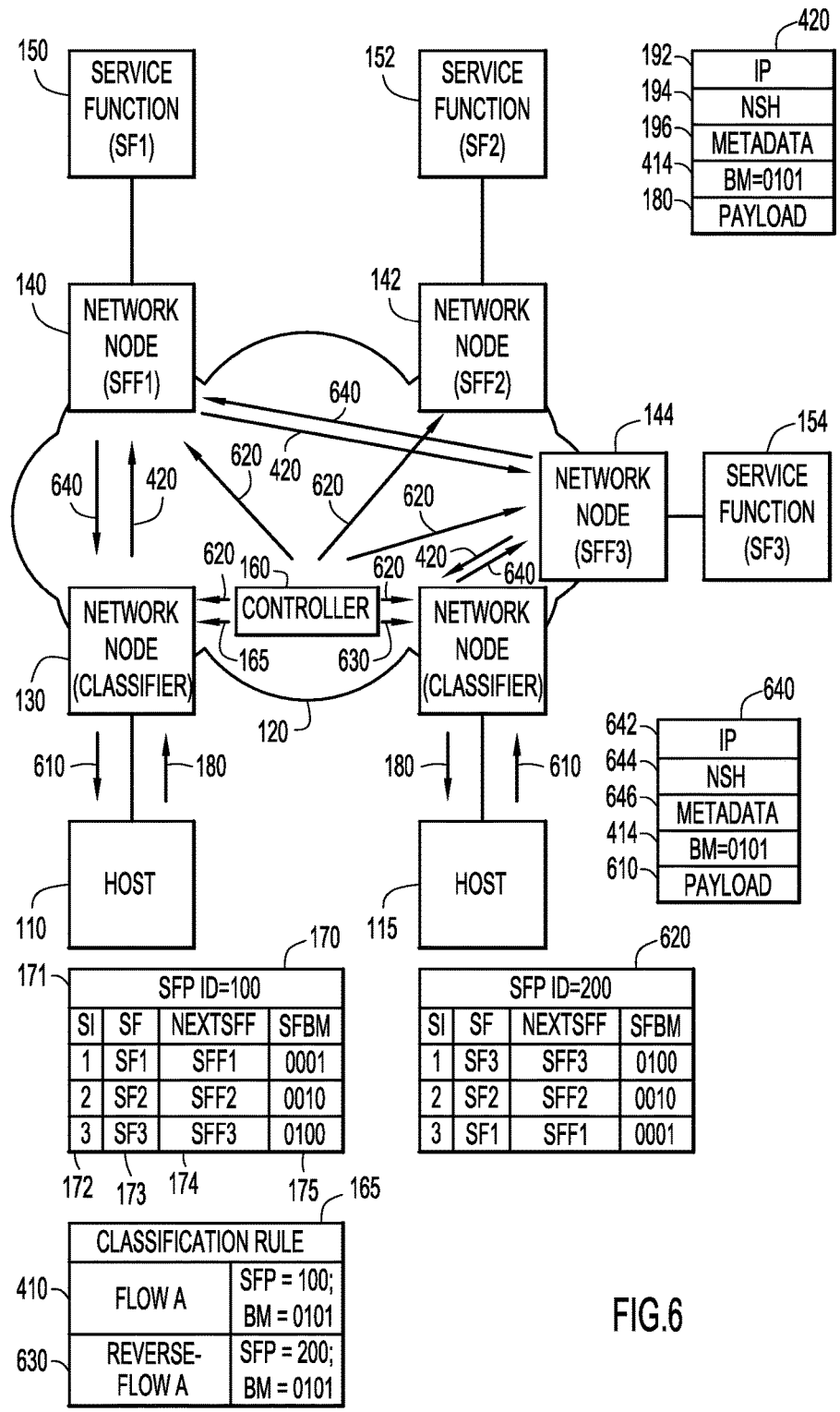
FIG. 6 is a system block diagram showing a Service Function Path for a reverse flow according to an example embodiment.

In some instances, a data flow between a source host 110 and a destination host 115 may be matched with a reverse flow from host 115 to host 110. Since the flows are matched to each other, if a service function is skipped in one flow, that service function may be skipped in the corresponding reverse flow. Referring now to FIG. 6, a simplified block diagram shows a reverse flow that skips the same service function as the forward flow. Host 115 sends a packet 610 toward host 110 in a reverse flow of data matched with the flow from host 110 to host 115. A classifier node 615 receives the packet 610 from the host 115 and encapsulates the packet 610 as it travels along the reverse SFP.

The controller defines a new SFP table 620 for the reverse flow from host 115 to host 110. The new SFP table 620 reverses the order of the service functions in the SFP table 170 by reversing the order of the service index. The controller distributes the new SFP table 620 to all of the network nodes in the network 120. The controller also creates a classification rule 630 that identifies the reverse flow, the reverse flow SFP identifier from the SFP table 620, and the service bitmask 414 from the classification rule 410.

When the packet 610 reaches the ingress/classifier network node 615 for the reverse flow, the network node 615 encapsulates the packet according to the classification rule 620. The network node 615 sends the encapsulated packet 640 to the first network node 144 identified in the SFP table 620. The encapsulated packet includes an IP header 642, a Network Service Header 644, metadata 646, the service bitmask 414, and the payload 610. By the same mechanism described above with respect to FIGS. 4 and 5, the network node 144 skips the second service function, since the service bitmask 414 indicates that the second service function will be skipped. The network node 144 sends the encapsulated packet 640 directly to service node 140 for the service function 150, and on to the host 110.

Figure 7:
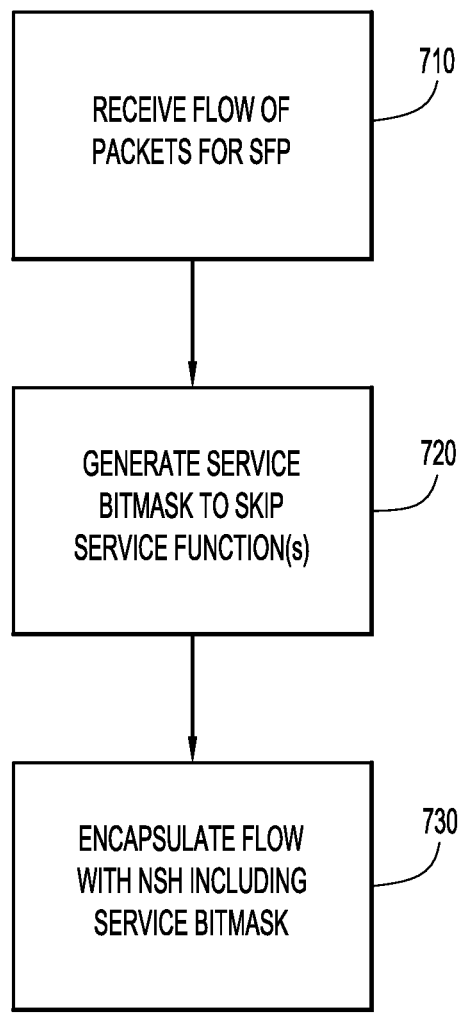
FIG. 7 is a flowchart showing the operations of a classifier network device processing a flow with a service bitmask according to an example embodiment.

Referring now to FIG. 7, a flowchart is shown for a process 700 in which a classifier node incorporates a service bitmask into a SFP for a flow of packets according to one example. In step 710, the classifier node receives a flow of packets, e.g., from a host or a separate network, that is to be processed in the Service Function Path. The classifier node generates a service bitmask in step 720, setting all of the bits corresponding to service functions that will be performed, and un-setting all of the bits corresponding to service functions that will be skipped. In one example, the classifier receives an indication of which service functions will be skipped for a particular flow prior to receiving the packets in that particular flow, such as from controller 160. In step 730, the classifier node encapsulates the incoming flow with a Network Service Header that includes the service bitmask.

Figure 8A:
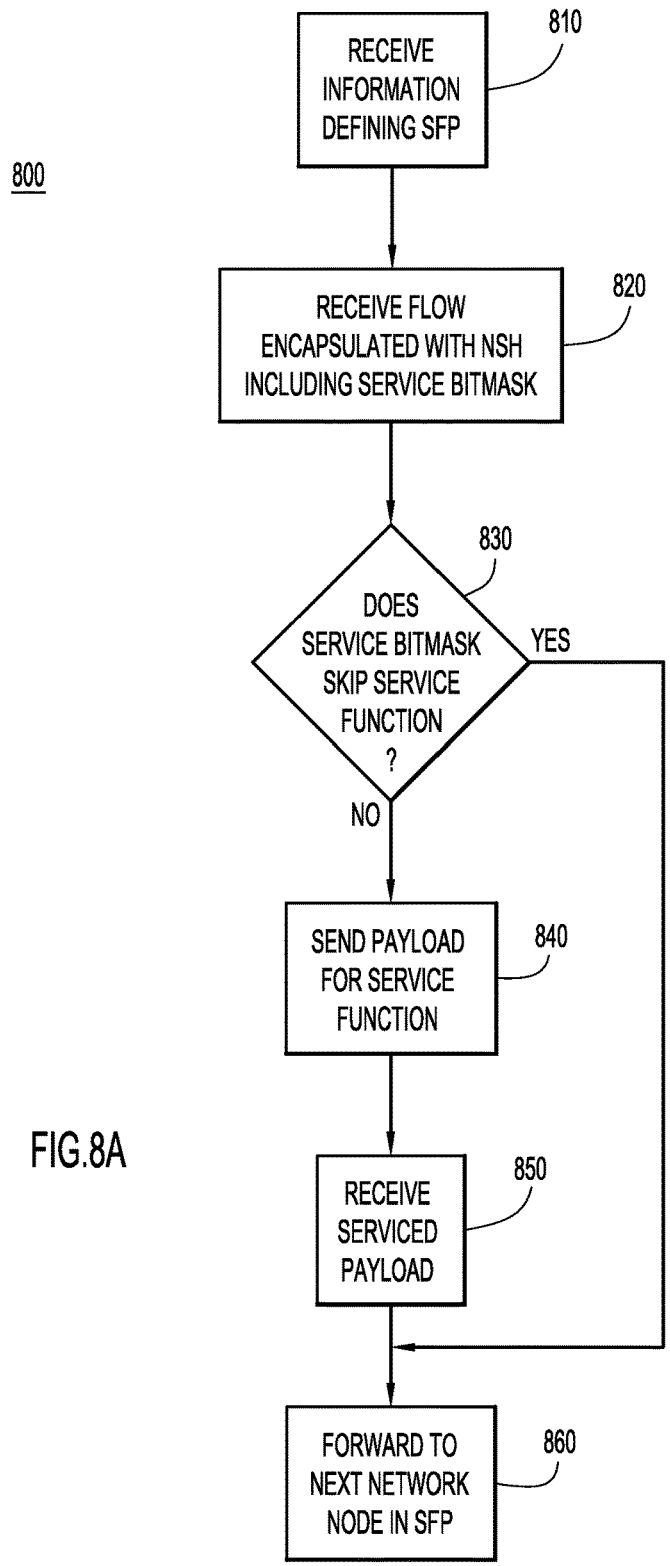
FIGS. 8A and 8B are flowcharts showing the operations of service function forwarding network device processing a flow with a service bitmask according to example embodiments.

Referring now to FIG. 8A, a flowchart is shown for a process 800 in which a network node associated with a service function handles an encapsulated flow in a SFP with a service bitmask according to one example. In step 810, the network node receives information from a controller that defines a Service Function Path. The information may take the form of an SFP table with an ordered list of service functions, service function forwarders, and service function bitmasks. In step 820, the network node receives a flow encapsulated with a Network Service Header that includes a service bitmask. If the service bitmask indicates that the service function associated with the network node will be performed, i.e., will not be skipped, as determined in step 830, then the network node sends the payload of the encapsulated flow to receive the service function associated with the network node in step 840. In one example, the service function may be provided by a separate computing device coupled to the network node. In step 850, the network node receives the serviced payload from the service function. After receiving the serviced payload, or if the service function associate with the network node will be skipped, the network node forwards the encapsulated flow to receive the next service function in step 860.

Figure 8B:
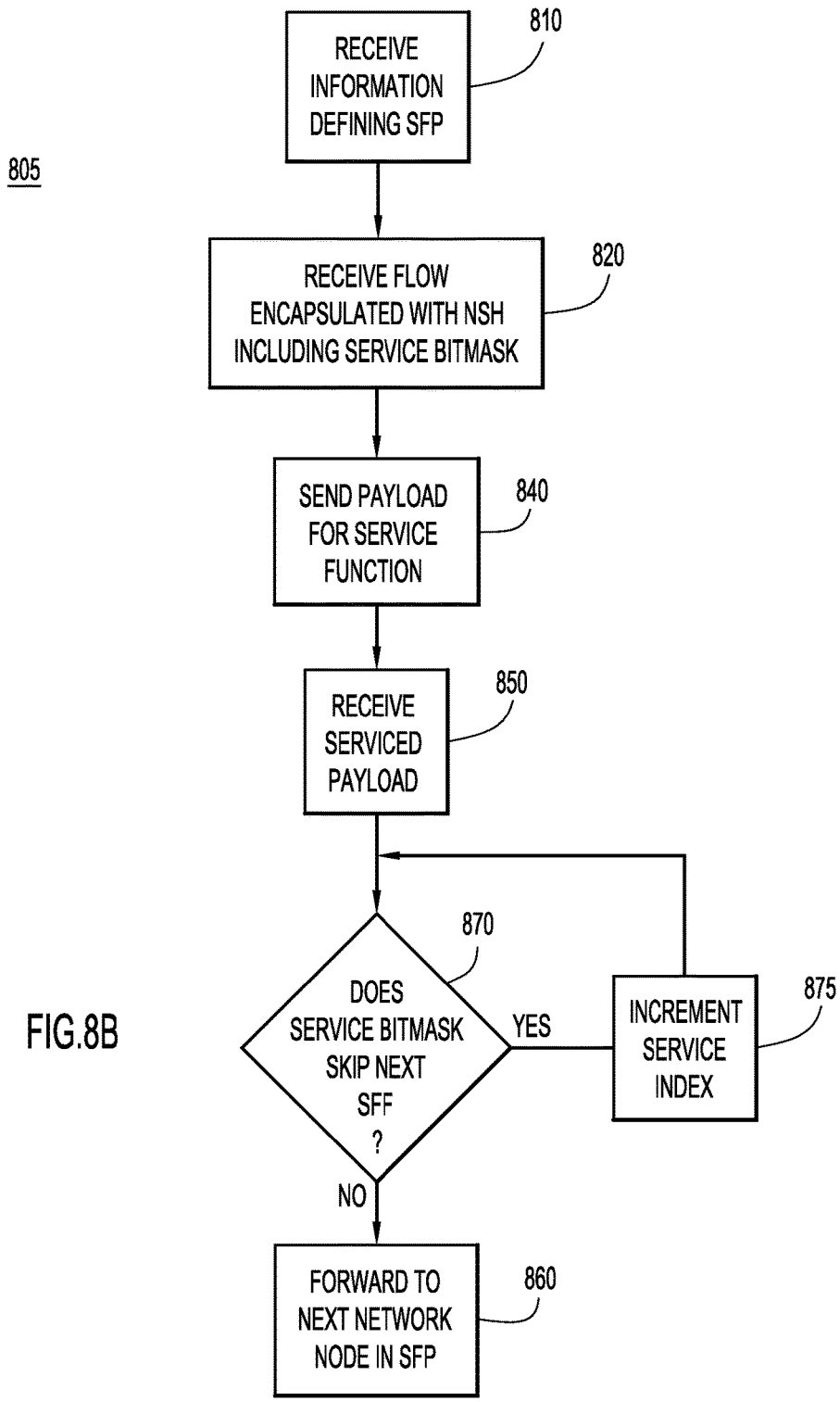

Referring now to FIG. 8B, a flowchart is shown for a process 805 in which a network node associated with a service function handles an encapsulated flow in a SFP with a service bitmask according to another example. In step 810, the network node receives information from a controller that defines a Service Function Path. The information may take the form of an SFP table with an ordered list of service functions, service function forwarders, and service function bitmasks. In step 820, the network node receives a flow encapsulated with a Network Service Header that includes a service bitmask. The network node sends the payload of the encapsulated flow to receive the service function associated with the network node in step 840. In one example, the service function may be provided by a separate computing device coupled to the network node. In step 850, the network node receives the serviced payload from the service function.

After receiving the serviced payload, in step 870, the network node compares the service bitmask from the Network Service Header and the service function bitmask from the SFP table to determine whether the next service function will be skipped. If the next service function will not be skipped, then the network node forwards the encapsulated packet to the next network node in the SFP in step 860. If the service bitmask indicates that the next service function will be skipped, the network node increments the service index in step 875. The network node then repeats step 870 and compares the service function bitmask from the incremented service index of the SFP table with the service bitmask from the Network Service Header.

Figure 9:
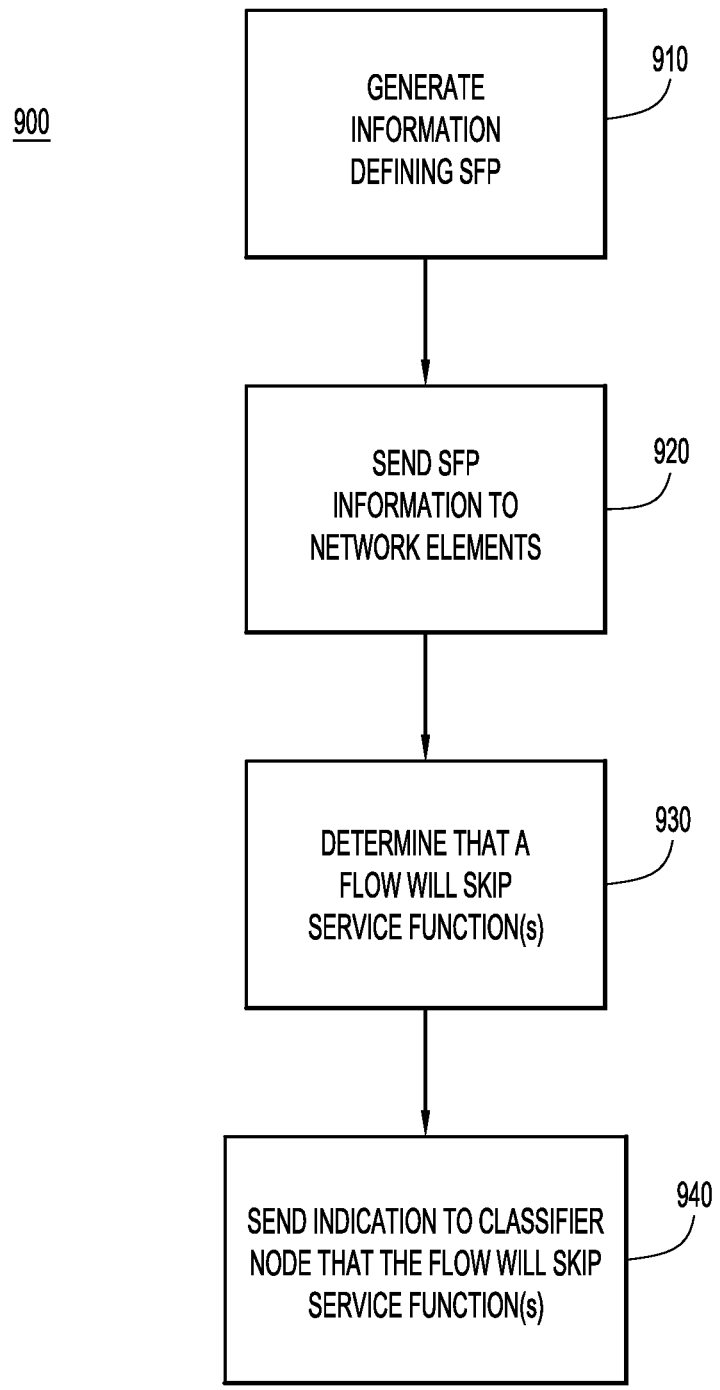
FIG. 9 is a flowchart showing the operations of a network controller preparing the network for Service Function Paths with a service bitmask according to an example embodiment.

Referring now to FIG. 9, a flowchart is shown for a process 900 in which a network controller incorporates a service bitmask into a SFP according to one example. In step 910, the controller generates information that defines a Service Function Path, e.g. a SFP table. The controller sends the SFP information to all of the network devices in the network in step 920. In step 930, the controller determines that a flow will skip one or more of the service functions in the Service Function Path. In one example, the controller may receive an indication from one of the network devices that the service function associated with the network device is not needed for a particular flow, and that the flow may skip the service function. In step 940, the controller sends an indication to the classifier node for that particular flow that the flow will skip the one or more service functions.

In summary, the techniques described herein provide for a bitmask with a bit position allocated to each of the service functions available in a network domain. The service bitmask in included in the Network Service Header, in addition to the forwarding information defining the Service Function Path. When one of the service functions can be skipped, the network controller only needs to notify the classifier/ingress node to modify the service bitmask for that flow. The controller does not create a new Service Function Path, which would need to be distributed to all of the network elements. The forwarding lookup and decision to determine the next destination in the Service Function Path is determined by comparing the service bitmask from the Network Service Header and the service function bitmask from the Service Function path definition.

In one form, the techniques presented herein provide for a computer-implemented method performed at a classifier network element, the method including receiving a flow of packets subject to a service function path. The service function path comprises a plurality of service functions in a specific order. A service bitmask is generated that indicates that one or more service functions will be skipped. The classifier network element encapsulates the flow as a payload with a network service header comprising a service function path identifier, a service index, and the service bitmask.

In another form, the techniques presented herein provide for an apparatus comprising a network interface unit and a processor. The network interface unit communicates with network elements and a controller of the network. The processor receives, via the network interface unit, a flow of packets subject to a service function path. The service function path comprises a plurality of service functions in a specific order. The processor generates a service bitmask that indicates that one or more service functions will be skipped. The processor encapsulates the flow as a payload with a network service header comprising a service function path identifier, a service index, and the service bitmask.

In still another form, the techniques presented herein provide for one or more non-transitory computer readable storage media with computer executable instructions to cause a processor to receive a flow of packets subject to a service function path. The service function path comprises a plurality of service functions in a specific order. The instructions cause the processor to generate a service bitmask that indicates that one or more service functions will be skipped. The instructions further cause the processor to encapsulate the flow as a payload with a network service header comprising a service function path identifier, a service index, and a service bitmask.

In another form, the techniques presented herein provide for a computer-implemented method performed at a network element associated with a first service function, the method including receiving information defining a service function path that comprises a plurality of service functions in a specific order. The network element receives an encapsulated flow of packets subject to the service function path. The encapsulated flow of packets comprises a payload and a network service header including a service function path identifier, a service index, and a service bitmask. The service bitmask indicates that one or more of the service function in the service function path will be skipped. The network element sends the payload to a first computing device to perform the first service function. The network element then receives the serviced payload from the first computing device.

In yet another form, the techniques presented herein provide for an apparatus comprising a network interface unit and a processor. The network interface unit communicates with network elements and a controller of the network. The processor receives, via the network interface unit, information defining a service function path that comprises a plurality of service functions in a specific order. The processor receives an encapsulated flow of packets subject to the service function path. The encapsulated flow of packets comprises a payload and a network service header including a service function path identifier, a service index, and a service bitmask. The service bitmask indicates that one or more of the service function in the service function path will be skipped. The processor sends the payload via the network interface unit to a first computing device to perform the first service function. The processor receives the serviced payload from the first computing device via the network interface unit.

In still another form, the techniques presented herein provide for one or more non-transitory computer readable storage media with computer executable instructions to cause a processor to receive information defining a service function path that comprises a plurality of service functions in a specific order. The instructions cause the processor to receive an encapsulated flow of packets subject to the service function path. The encapsulated flow of packets comprises a payload and a network service header including a service function path identifier, a service index, and a service bitmask. The service bitmask indicates that one or more of the service function in the service function path will be skipped. The instructions cause the processor to send the payload to a first computing device to perform the first service function. The instructions cause the processor to receive the serviced payload from the first computing device.

In yet another form, the techniques presented herein provide for a computer-implemented method performed at a network controller, the method including generating information defining a service function path. The service function path comprises a plurality of service functions in a specific order. The controller sends the information defining the service function path to a plurality of network elements, with each network element associated with at least one service function. The controller determines that a first flow of packets will skip one or more service functions of the plurality of service function in the service function path. The controller sends a first indication to a first classifier network element that the first flow of packets will skip the one or more service functions.

In another form, the techniques presented herein provide for an apparatus comprising a network interface unit and a processor. The network interface unit communicates with network elements in a network. The processor generates information defining a service function path as a plurality of service functions in a specific order. The processor sends the information defining the service function path via the network interface unit to a plurality of network elements, with each network element associated with at least one service function. The processor determines that a first flow of packets will skip one of more service functions of the plurality of service functions in the service function path. The processor sends a first indication via the network interface unit to a first classifier network element that the first flow of packets will skip the one or more service functions.

In still another form, the techniques presented herein provide for one or more non-transitory computer readable storage media with computer executable instructions to cause a processor to generate information defining a service function path as a plurality of service functions in a specific order. The instructions cause the processor to send the information defining the service function path to a plurality of network elements, with each network element associated with at least one service function. The instructions cause the processor to determine that a first flow of packets will skip one of more service functions of the plurality of service functions in the service function path. The instructions cause the processor to send a first indication to a first classifier network element that the first flow of packets will skip the one or more service functions.

The above description is intended by way of example only. Various modifications and structural changes may be made therein without departing from the scope of the concepts described herein and within the scope and range of equivalents of the claims.

What is claimed is:

1. A method comprising:
   receiving at a classifier network element, a definition of a service function path identifying a plurality of service functions in a specific order, wherein each of the identified service functions is associated with a corresponding service function bitmask that determines a corresponding position in the specific order for the corresponding service function;
   receiving at the classifier network element, a flow of packets subject to the service function path;
   generating a service bitmask that indicates one or more service functions of the plurality of service functions will be skipped;
   encapsulating packets of the flow as a payload with a network service header comprising a service function path identifier, a service index that is incremented at each service function along the service function path, and the service bitmask that is unchanged at each service function along the service function path; and
   determining a first service function of the service function path based on a combination of the service bitmask and the corresponding service function bitmask of the first service function.

2. The method of claim 1, further comprising:
   sending encapsulated packets of the flow to a first network element associated with the first service function that will not be skipped.

3. The method of claim 1, wherein determining the first service function comprises determining the first service function based on the service bitmask and a service function path table defining the specific order of the service function path.

4. The method of claim 1, wherein each position in the service bitmask corresponds to a particular service function in the service function path.

5. The method of claim 1, wherein each position in the service bitmask corresponds to a particular service function in a service function chain domain.

6. The method of claim 1, wherein the network service header includes the service bitmask after a plurality of fixed length metadata channel headers.

7. The method of claim 1, wherein the network service header includes the service bitmask as a variable length context header.

8. A method comprising:
   receiving at a first network element associated with a first service function, a definition of a service function path identifying a plurality of service functions in a specific order, wherein each of the identified service functions is associated with a corresponding service function bitmask that determines a corresponding position in the specific order for the corresponding service function;
   receiving an encapsulated packets of a flow subject to the service function path, the encapsulated packets comprising a payload and a network service header including a service function path identifier, a service index that is incremented at each service function along the service function path, and a service bitmask that indicates that one or more of the service functions in the service function path will be skipped, wherein the service bitmask is unchanged at each service function along the service function path;
   sending the payload to a first computing device to perform the first service function;
   receiving a serviced payload from the first computing device; and
   determining a next service function in the specific order of the service function path based on a combination of the service bitmask and the corresponding service function bitmask of the first service function.

9. The method of claim 8, further comprising:
   encapsulating the serviced payload with the network service header including the service function path identifier, the service index incremented to a value associated with the next service function, and the service bitmask; and
   sending the encapsulated serviced payload to a next network element associated with the next service function that will not be skipped.

10. The method of claim 8, wherein determining the next service function comprises determining the next service function based on the service bitmask and the definition identifying the specific order of the service function path.

11. The method of claim 8, wherein each position in the service bitmask corresponds to a particular service function in the service function path.

12. The method of claim 8, wherein each position in the service bitmask corresponds to a particular service function in a service function chain domain.

13. The method of claim 8, wherein the network service header includes the service bitmask after a plurality of fixed length metadata channel headers.

14. The method of claim 8, wherein the network service header includes the service bitmask as a variable length context header.

15. A method comprising:
- generating a definition of a service function path that identifies a plurality of service functions in a specific order, wherein each of the identified service functions is associated with a corresponding service function bitmask that determines a corresponding position in the specific order for the corresponding service function;
- sending the definition to a plurality of network elements, each network element associated with at least one service function;
- determining that a first flow of packets will skip one or more service functions of the plurality of service functions in the service function path;
- generating a first classification rule identifying the first flow of packets, the service function path, and a service bitmask indicating the one or more service functions that will be skipped, wherein the service bitmask is unchanged at each service function along the service function path;
- sending the first classification rule to a first classifier network element.

16. The method of claim 15, wherein the definition includes the service function bitmask.

17. The method of claim 16, wherein each position in the service function bitmask corresponds to a particular service function in the service function path.

18. The method of claim 16, wherein each position in the service function bitmask corresponds to a particular service function in a service function chain domain.

19. The method of claim 15, further comprising:
- determining that a second flow of packets related to the first flow of packets will follow the service function path in a reverse order; and
- generating a second classification rule identifying the second flow of packets, the service function path, and the service bitmask indicating the one or more service functions that will be skipped;
- sending the second classification rule to a second classifier network element.

20. The method of claim 19, wherein the second flow comprises return traffic from the first flow.

* * * * *